United States Patent
Krug

(10) Patent No.: US 10,471,787 B2
(45) Date of Patent: Nov. 12, 2019

(54) SCISSOR-TYPE FRAME AND COMMUTING PASSAGE WITH SCISSOR-TYPE FRAME

(71) Applicant: Hübner GmbH & Co. KG, Kassel (DE)

(72) Inventor: Michael Krug, Niedenstein (DE)

(73) Assignee: Hübner GmbH & Co. KG, Kassel (DE)

(*) Notice: Subject to any disclaimer, the term of this patent is extended or adjusted under 35 U.S.C. 154(b) by 170 days.

(21) Appl. No.: 15/682,794

(22) Filed: Aug. 22, 2017

(65) Prior Publication Data
US 2018/0056741 A1   Mar. 1, 2018

(30) Foreign Application Priority Data

Aug. 23, 2016   (EP) .................................... 16185310

(51) Int. Cl.
*B60D 5/00* (2006.01)
*B61D 17/22* (2006.01)

(52) U.S. Cl.
CPC ............... *B60D 5/006* (2013.01); *B60D 5/00* (2013.01); *B61D 17/22* (2013.01)

(58) Field of Classification Search
CPC .......... B60D 5/006; B60D 5/00; B60D 5/003; B61D 17/22
See application file for complete search history.

(56) References Cited

U.S. PATENT DOCUMENTS

| 2,099,817 | A | * | 11/1937 | Mahana | B61C 9/10 105/102 |
|---|---|---|---|---|---|
| 3,335,815 | A | | 8/1967 | Oakes | |
| 4,458,911 | A | * | 7/1984 | Chadwick | B61D 17/20 280/403 |
| 4,903,612 | A | * | 2/1990 | Sassa | B60D 5/006 105/18 |
| 6,722,685 | B2 | * | 4/2004 | Koch | B60D 5/00 280/492 |
| 7,338,060 | B2 | * | 3/2008 | Koch | B61D 17/20 105/3 |
| 7,600,772 | B2 | * | 10/2009 | Koch | B60D 5/003 280/401 |
| 7,658,396 | B2 | * | 2/2010 | Koch | B60D 5/00 105/18 |
| 8,459,683 | B2 | * | 6/2013 | Junke | B61D 17/20 280/403 |
| 2005/0104321 | A1 | * | 5/2005 | Koch | B60D 1/173 280/403 |

FOREIGN PATENT DOCUMENTS

| GB | 810734 | 3/1959 |
|---|---|---|
| WO | WO-199506580 | 3/1995 |

* cited by examiner

*Primary Examiner* — Joseph M Rocca
*Assistant Examiner* — Michael R Stabley
(74) *Attorney, Agent, or Firm* — Dinsmore & Shohl LLP

(57) ABSTRACT

Subject matter of the invention is the scissor-type frame (20) with at least one first and one second segment (22, 24), with the segments (22, 24) being connected with each other by means of a pivoting bearing (25), with the pivoting bearing (25) being divided into two pivoting bearing halves (31, 41) perpendicular to the plane of extension of the scissor-type frame, with a device (60) for detachable connection of the pivoting bearing halves (31, 41) being provided.

11 Claims, 6 Drawing Sheets

SCISSOR-TYPE FRAME AND COMMUTING PASSAGE WITH SCISSOR-TYPE FRAME

CROSS-REFERENCE TO RELATED APPLICATION

This application claims priority of European Application EP 16 185 310.6 filed Aug. 23, 2016.

FIELD OF THE INVENTION

The invention relates not only to a scissor-type frame with at least a first and a second segment wherein the segments are connected with each other by means of a pivoting bearing, but also to a communication passage with at least one such scissor-type frame.

BACKGROUND OF THE INVENTION

Scissor-type frames are well known from the State of the Art. Thus, for example, scissor-type frames are known as lifting devices on slidable lattice lifting platforms. Moreover scissor-type frames are also used as telescopic extracting means, for example, for receiving telephones.

Furthermore, the use of scissor-type frames is also known from vehicle construction. Hence, such scissor-type frames are used in particular with articulated vehicles. In this connection, reference is made, for example, to EP 0722 873 B1, from which a passage is known, wherein the individual members of such a bridge are connected with each other by a scissor-type frame in order to even out the extension and/or contraction of the members of such a bridge so that no spacing shall occur between the individual members. This means that the lattice serves to even out the extension of such a bridge.

Furthermore, in this connection in WO 95/06580, a communication passage between two coupled vehicles is described wherein the communication passage comprises two half bellows which can be coupled with each other by two coupling frames. The two coupling frames are connected with the respective vehicle in the bottom and roof area by one pair of scissor-type frames each between which the passage is located. The scissor-type frames in the bottom and in the roof area shall ensure a support of the coupling frames with it being guaranteed at the same time that due to formation of said scissor-type frames acting as support elements the coupling frames and consequently the bellows located on them can follow the movements of the vehicles. As has already been explained elsewhere, each one of the two coupling frames not only in the roof area but also in the bottom area is connected with the corresponding car body of the vehicle by one pair of scissor-type frames each. But the scissor-type frames of a pair of scissor-type frames are also connected with the scissor-type frames of the other opposite pair of scissor-type frames. For connection of the scissor-type frames, coupling bolts are provided here, which, for releasing the coupling frames, need only be removed in order to be able to separate the two vehicle parts in the area of the coupling frames which are initially connected with each other.

This means that from the State of the Art a connection of two scissor-type frames is known wherein in the area of the coupling frames the immediate connection of the segments of two scissor-type frames to be connected with respect to the scissor arms in the direction of extension is not force-transmitting. Rather, the scissor-type frames serve primarily to take up forces of the Z direction, this means, the load from the bellows. This means, contrary to the State of the Art, in the invention, due to the divided pivoting bearing, forces can be transmitted via the scissor arms in the plane of extension.

SUMMARY OF THE INVENTION

The objective of the invention is to provide a scissor-type frame of the type mentioned above, which is extensible in length, wherein the individual scissor-type frames shall be directly connected with each other for centering.

In order to achieve the objective, it is proposed according to the invention that the pivoting bearing is divided into two pivoting bearing halves perpendicular to the plane of extension of the scissor-type frame wherein a device for a detachable connection of the pivoting bearing halves is provided. The device for a detachable connection of the pivoting bearing halves can be formed here as a coupling device, hence, for example, as a spring coupling keeping both pivoting bearing halves in contact under spring force. Imaginable, however, is also a coupling device positively connecting the two pivoting bearing halves. The division means that the pivoting bearing between two segments perpendicular to the plane of extension of the scissor-type frame and advantageously transversely, hence, in particular in an angle of 90° to the longitudinal central axis of a scissor-type frame fastened on both ends can be divided into two substantially equal pivoting bearing halves, and the two substantially identical segments can be connected to a scissor-type frame closed in itself. By this it is achieved that due to the division in principle two identical segments are provided, which does not only offer the possibility of being able to produce scissor-type frames closed in itself, that means, uniform scissor-type frames of any length, for example, by interposing further segments, wherein the individual segments of such a scissor-type frame are all connected with each other in a movable manner, that means, in particular extensibly, but that also the centering capability of such a scissor-type frame in each point of intersection of the scissor-type frame exists. For vehicles or vehicle parts, which are connected with each other also by such scissor-type frames, this means that such vehicles or vehicle parts in the scissor-type frame in the area of the pivoting bearings of the segments can be coupled almost in any manner. If one considers in this connection again the State of the Art according to the WO 95/06580, the division of two scissor-type frames among each other occurs here outside of the pivoting bearings, namely in the transition area between two pivoting bearings.

Advantageous features and embodiments of the invention result from the dependent patent claims.

Hence, it is provided according to a special feature of the invention that each segment can be hinged to a component part by means of a swivel bearing. The component part constitutes a fixed point here and can be, for example, the car body of a vehicle to which a segment is hinged in a swivelling manner, for example, by means of a console through the swivel bearing.

Advantageously, each segment comprises four scissor arms, wherein two first and second scissor arms are connected with each other in a rotatable or swivelling manner by the swivel bearing, and wherein each segment comprises two further third and fourth scissor arms which are hinge-linked with the first and second scissor arms, wherein the third and fourth scissor arms comprise on their ends a first and a second pivoting bearing head each for forming the pivoting bearing halves. From this, it becomes clear that when dividing a scissor-type frame into two segments, two substantially equal scissor arms occur formed by the two pivoting bearing heads of two scissor arms which converge in the area of the pivoting bearing and/or the pivoting bearing half. The first and the second pivoting bearing head of a pivoting bearing half of each segment corresponds to that of the other segment so that, as has already been mentioned elsewhere, not only a coupling or connection of the two scissor-type frames is possible but also an extension of the scissor-type frame by interposing another segment. Such a coupling possibility is interesting in particular in vehicle construction, namely for articulated vehicles. In the case of an articulated vehicle with a passage with a bellows, the bellows can comprise a communication passage with two bridge plates and a treadplate connecting the bridge plates. The movement of the treadplate relative to the two bridge plates is controlled by the scissor-type frame because it shall be prevented that between the bridge plates, on the one hand, and the treadplate resting on it, on the other hand, gaps occur. When the vehicle parts or vehicles of such an articulated vehicle shall then be decoupled, said decoupling can occur precisely centrally between the two vehicle parts, namely precisely centrally between the two bridge plates, this means, decoupling can be made centrally on the treadplate. Hence the passage halves are equal so that the coupling of any vehicles or vehicle parts formed with the same passage can occur. This means that each vehicle or vehicle part can be coupled with any other vehicle or vehicle part of the same type. But from this it also results that due to the fact that the scissor arms are connected in a force-transmitting manner through the pivoting bearing, centering of the treadplate occurs in the case of connection with the treadplate.

With respect to the formation of the one first pivoting bearing head, it is provided that this pivoting bearing head comprises two bearing legs spaced apart from each other wherein the second pivoting bearing head is mounted between the bearing legs of the first pivoting bearing head. The two first and second pivoting bearing heads can be rotated relatively to each other, in particular by guidance kept rotatable relatively to each other, wherein by the guidance it is achieved that shifting of the pivoting bearing heads in radial direction is avoided. As a radial guidance between the pivoting bearing heads a tongue and groove guidance is provided. When division of the scissor-type frame in the pivoting bearing is made, four pivoting bearing heads each of the scissor arms of both segments occur. The pivoting bearing heads are coupled with each other by the coupling device. Hence, the pivoting bearing heads of the two segments are connected with each other in a force-transmitting manner.

According to another feature of the invention, the first and second pivoting bearing heads for receiving a pivot pin are formed in the manner of a bearing shell. From this it becomes clear that the pivot pin forms the axis between the two pivoting bearing heads. The pivot pin can project beyond the pivoting bearing heads here in order to be covered by the coupling device, as this will be explained in detailed below.

Moreover, in detail it is provided for the first pivoting bearing head that said pivoting bearing head comprises two pivoting bearing legs spaced apart from each other comprising a coupling groove on their upper side and on their underside extending horizontally in mounted condition. The coupling groove is formed in a curved manner here.

The coupling device itself comprises a first and a second coupling member wherein the first and the second coupling member are lockable with each other, wherein the first coupling member is located on the one first segment and the second coupling member is located on the other second segment. Here, advantageously the first coupling member comprises two coupling fingers spaced apart from each other for receiving through the coupling groove. The coupling finger has a recess formed correspondingly to the coupling groove for positive receiving of the coupling finger in the coupling groove. The second coupling member in this connection has two coupling eyes spaced apart from each other for receiving the pivot pin, which, as has already been explained elsewhere, projects beyond the pivoting bearing heads in axial direction of the pivot pin. From this it becomes clear that the first and second coupling member can be connected, i.e. coupled with each other such that the pivoting bearing heads of the two segments form the pivoting bearing already mentioned. By the coupling of the pivoting bearing halves, the pivoting bearing heads of two segments are connected with each other in a force-transmitting manner.

The pivoting bearing halves of the segments are formed in a different manner with respect to the receiving by the first and second coupling member. This means that the first coupling member is located on the first pivoting segment and the second coupling member is located on the second pivoting segment.

According to another feature of the invention it is provided that the scissor arms comprise replaceable intermediate members by which the scissor arms can be shortened or extended.

Subject matter of the invention is also a passage between two articulated vehicles or vehicle parts comprising at least a tunnel-shaped covering, for example, a bellows, wherein in the area of the tunnel-shaped covering passage component parts are provided which are oriented in a center-adjustable manner by means of a centering device between the car bodies of the vehicles or vehicle parts, wherein the centering device comprises at least a scissor-type frame, wherein the scissor-type frame comprises at least a first and a second segment, wherein the segments are connected with each other by means of a pivoting bearing, wherein the pivoting bearing is divided into two pivoting bearing halves perpendicular to the plane of extension of the scissor-type frame, wherein a device for a detachable connection of the pivoting bearing halves is provided. Here, each segment can advantageously be hinged to a vehicle by means of a swivel bearing.

The passage component parts, which can be centered in the area of the passage by the at least one scissor-type frame, include in particular at least one plate-shaped element of a side wall and/or a roof covering and/or a communication passage or the central frame of a two-part bellows. Moreover, it is provided in particular in this connection that the plate-shaped element of a roof covering or a side wall covering forms the connecting plate between the side wall bridge plates or roof bridge plates located on the fronts of the articulated vehicles or vehicle parts. The roof bridge plates or side wall bridge plates each located on the front of a vehicle part are spaced from each other. The distance between the two side wall bridge plates of a side wall covering or the roof bridge plates of a roof covering each is bridged over in an overlapping manner by a connecting plate. The connecting plate itself, for avoiding the occurrence of gaps relative to the two roof bridge plates or side wall bridge plates located on the fronts of the vehicles or vehicle parts, is centered by at least one scissor-type frame between the roof bridge plates or the side wall bridge plates, wherein the scissor-type frame is located likewise on the fronts of the vehicles or vehicle parts through a pivot joint.

A communication passage between two articulated vehicles as a component of a passage permits the crossing of individuals between two vehicles or vehicle parts. In this connection a communication passage is formed by a bridge plate located each on the fronts of the vehicle parts or vehicles, wherein the distance between the two bridge plates is bridged over by a plate-shaped element as a treadplate. On the underside of the treadplate the at least one scissor-type frame is located. Such a centering is required in order to guarantee that during driving no gaps, for example, between the treadplate and the bridge plates occur.

BRIEF DESCRIPTION OF THE DRAWINGS

By means of the drawings the invention is explained more in detail below by means of an example.

DETAILED DESCRIPTION OF THE PREFERRED EMBODIMENTS

Figure 1:
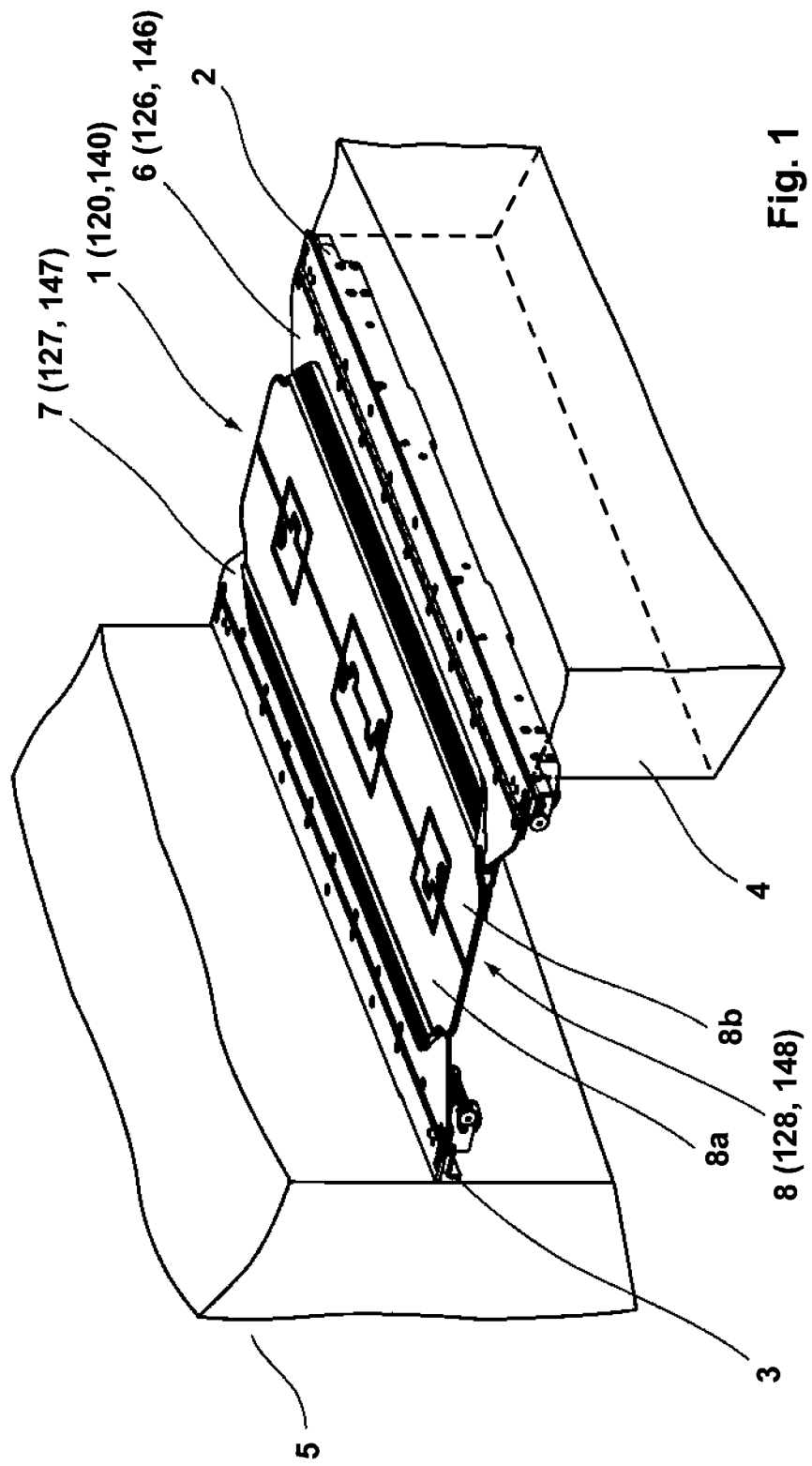
FIG. 1 shows the communication passage in a perspective view wherein the car bodies of the articulated vehicles are only indicated.

The communication passage shown in FIG. 1 has the reference numeral 1. The communication passage 1 is connected with the car bodies 4, 5 by consoles 2, 3 wherein the car bodies are only schematically indicated. The communication passage 1 is an integral part of a passage between articulated vehicles which usually still comprises a bellows (not shown) which extends between the front walls of the car bodies 4, 5 of the vehicles or vehicle parts. The bellows can surround the communication passage in a tunnel-shaped, i.e. U-shaped manner, here or it can also be formed in a box-shaped, closed manner.

The communication passage 1 comprises each a bridge plate 6, 7 located on the console 2, 3 wherein the treadplate designated with 8 is mounted on the bridge plates 6, 7. The treadplate 8 can be divided in the center with two identical communication passage halves occurring with respect to the communication passage 1 when the communication passage is divided. The treadplate halves have the reference numeral 8a, 8b.

Figure 2:
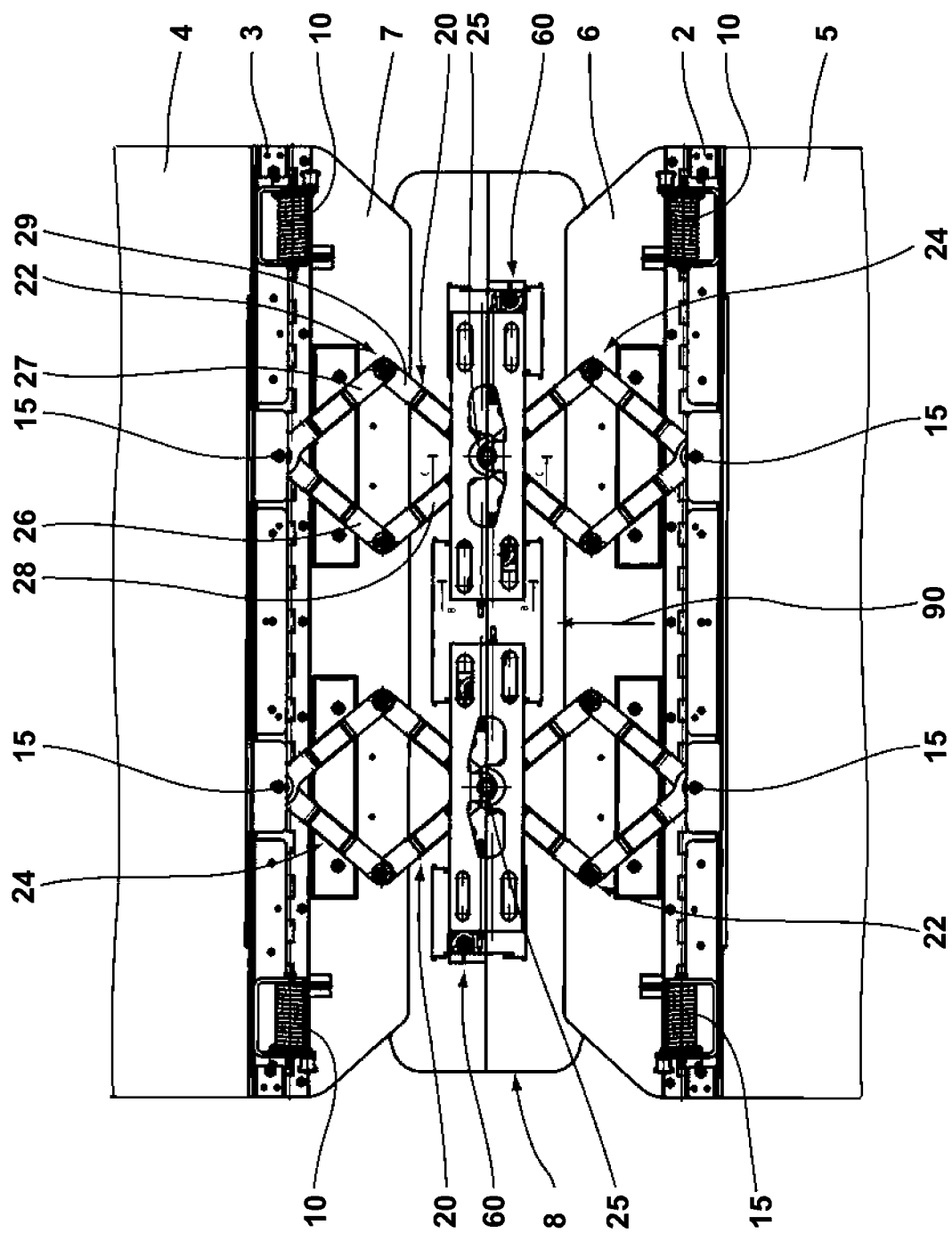
FIG. 2 shows a view from below on the communication passage according to FIG. 1.

FIG. 2 shows a view from below on the communication passage 1. Visible are again the two consoles 2, 3 which are connected with the car bodies 4, 5. The consoles 2, 3 each show two spiral springs 10 spaced apart from each other wherein the spiral springs 10 ensure that the respective bridge plate 6, 7 is pressed against the underside of the treadplate 8 in order to keep the corresponding bridge plate and the treadplate halves 8a, 8b in the horizontal in the case of division of the communication passage, for example, when decoupling two vehicle parts, and thus when dividing the passage.

Moreover, the consoles 2, 3 receive the two scissor-type frames 20 extending in parallel to each other. As has already been explained, the scissor-type frames 20 are in principle identical to each other. The plane of extension is identified by the arrow 90. Each scissor-type frame 20 comprises a first segment 22 and a second segment 24. As can be seen, the first and the second segments 22, 24 of each scissor-type frame 20 are facing each other diagonally. The first and the second segment 22, 24 are coupled by the pivoting bearing designated with 25. The connection of the scissor-type frames 20 with the consoles 2, 3 occurs by swivel bearings 15. It is provided here in detail that each segment comprises a first scissor arm 26 and a second scissor arm 27 which are rotatably received by the swivel bearing 15. The first and the second scissor arm 26, 27 are hinge-linked with a third scissor arm 28 and a fourth scissor arm 29, as this can be seen directly in FIG. 2. At the end, the third and fourth scissor arm 28, 29 are brought together in the pivoting bearing 25. In the area of the pivoting bearing 25 the coupling device designated with 60 is provided.

The scissor arms 26, 27, 28, 29 themselves comprise insertable intermediate members 80 by which the scissor arms 26, 27, 28, 29 can be adjusted in their length, and thus the length of the segments, to the length of the passage. This means that the intermediate members have an adapter function.

Figure 3:
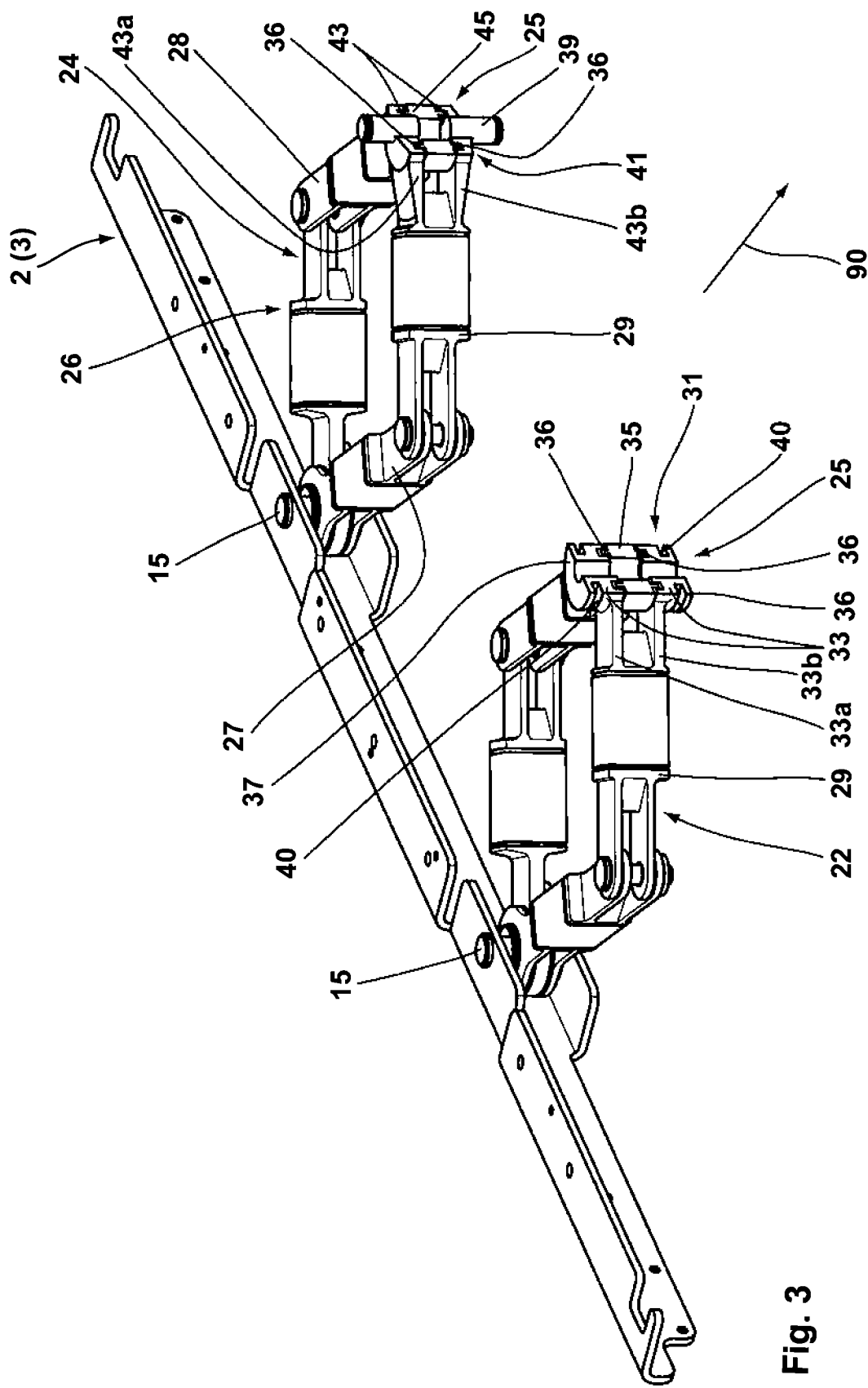
FIG. 3 shows two segments located adjacent to each other of two slidable lattice stands extending in parallel to each other as they are shown in FIG. 2.

If one now considers FIG. 3, which shows a first segment 22 and a second segment 24, which are hinged to the console 2, 3 by the swivel bearing 15 extending in parallel to each other. Moreover, the first and second scissor arms 26, 27 located on the swivel bearing 15 can be seen, which are hinge-linked with the third scissor arm 28 and the fourth scissor arm 29. The pivoting bearing designated with 25 is formed by the two pivoting bearing halves 31, 41 of the first segment 22 and the second segment 24. In detail, the pivoting bearing half 31, 41 comprises a first U-shaped pivoting bearing head 33, 43, wherein between the legs 33a, 33b and 43a, 43b of the U-shaped first pivoting bearing head the second pivoting bearing head 35, 45 is mounted which is part of the third scissor arm 28. The first pivoting bearing head 33, 43, which is U-shaped, is part of the fourth scissor arm 29. Moreover, the first pivoting bearing head 33, 43 is connected with the second pivoting bearing head 35, 45 by two guidances 36 which are formed in the manner of a tongue and groove connection. By the two guidances 36, which are arranged between the two pivoting bearing heads 33, 35, 43, a guidance in radial direction is achieved.

Moreover, the pivoting bearing half 41 receives the pivot pin 39, as it can likewise be seen in FIG. 3.

The first segment 22 is formed substantially identical to the second segment 24. A difference exists only in that the first pivoting bearing head 33 of the first segment 22 on the upper and lower end respectively has a protrusion 37 and comprises a coupling groove 40, which, similar to the pivot pin 39, in connection with the coupling device 60 serves for connecting a first and a second segment in order to form a scissor-type frame. The segments can hence also be designated as a first positive and a second negative segment.

As has already been explained elsewhere, in FIG. 3 only a first and a second segment 22, 24 are shown. It is pointed out that an entire scissor-type frame is comprised of at least a first and at least a second segment 22, 24. This means that the first segment 22 according to FIG. 3 for the formation of an entire scissor-type frame is connected with the second segment 24 in the area of the pivot pin 39 by the coupling device in order to form the pivoting bearing. The advantage of this crosswise arrangement of first and second, hence positive and negative segments on the respective consoles 2, 3 is that by this always a coupling possibility exists which is of particular interest, if, for example, as it has been explained elsewhere, the scissor-type frames are arranged in the area of a passage between two articulated vehicles or vehicle parts, wherein it shall be possible to couple the vehicles or vehicle parts of such an articulated vehicle among each other in any way.

Figure 4:
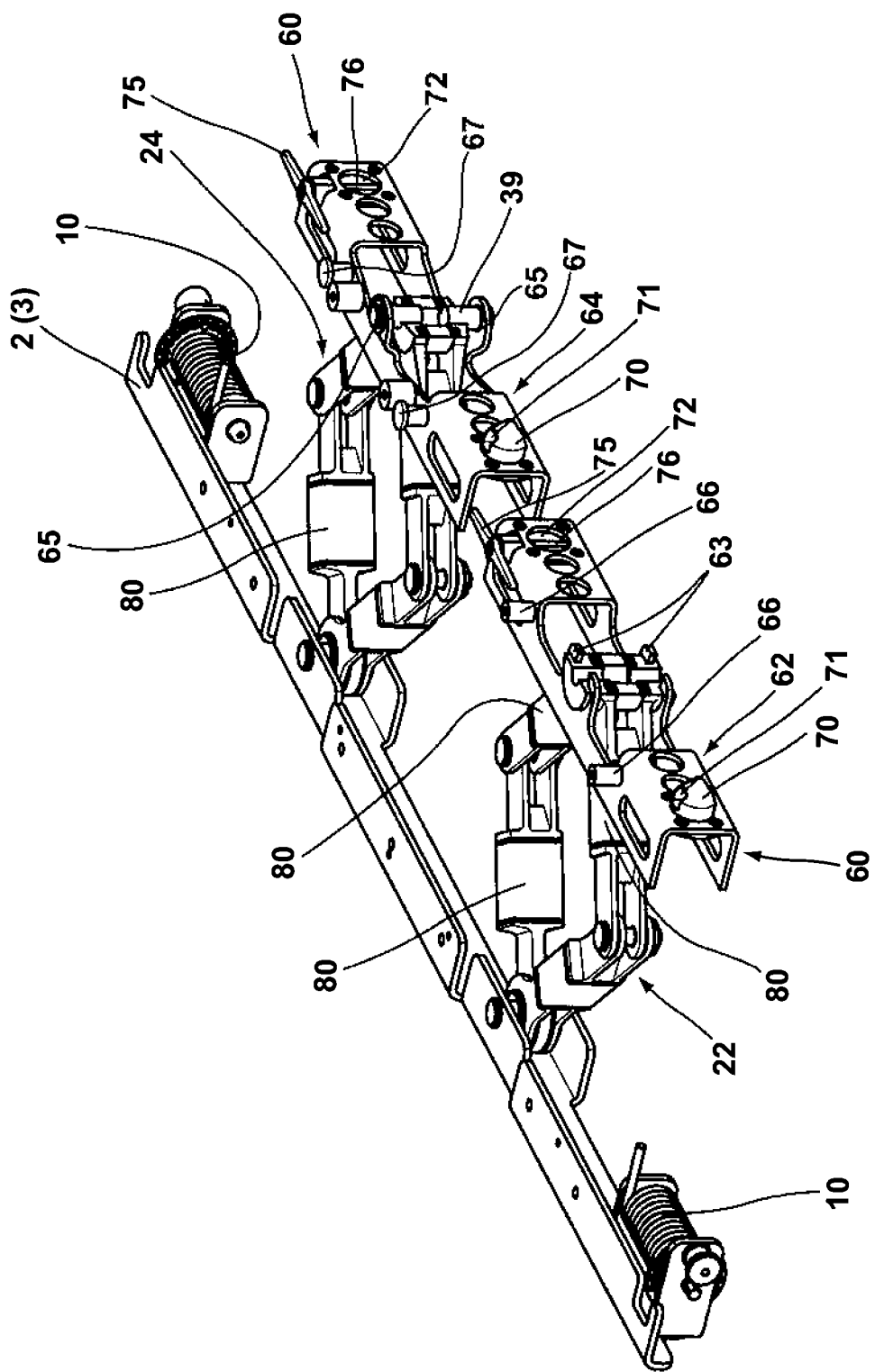
FIG. 4 shows a presentation according to FIG. 3 wherein the segments each comprise a coupling member at the end.

If one now considers FIG. 4, one can see the embodiment of the coupling device designated with 60. The first positive and the second negative segment 22, 24 comprise here at the end each one positive and one negative coupling member 62, 64 with the two coupling members 62, 64 forming the coupling device 60. Moreover, the positive coupling member 62 comprises two coupling fingers 63 placed one above the other, which engage into the coupling groove 40 located at the upper end and at the lower end of the first pivoting bearing head 33 which coupling groove is mounted in protrusion 37 (FIG. 3).

Correspondingly, the negative coupling member 64 with the coupling eyes 65 placed one above the other and spaced apart receives the pivot pin 39. In order to produce an entire scissor-type frame 20, the positive and the negative coupling member 62, 64 are now engaged with each other with the locking pin designated with 70 engaging into the corresponding pin opening 72 of the corresponding coupling member 62, 64. The locking pin 70 comprises an opening 71 into which the locking member 75 can be inserted with the locking bolt 76. This means that the positive coupling member 62 is coupled with the negative coupling member 64 at both ends by the locking member 75 in connection with the locking pin 70.

Not only the positive but also the negative coupling member 62, 64 are connected with the treadplate 8 for guidance of the treadplate by fixed bearings and movable bearings 66, 67. In detail, the positive coupling member comprises two threaded cams 66 as fixed bearings and the negative coupling member comprises two head bolts 67 as movable bearings for connection with the treadplate 8.

Figure 5:
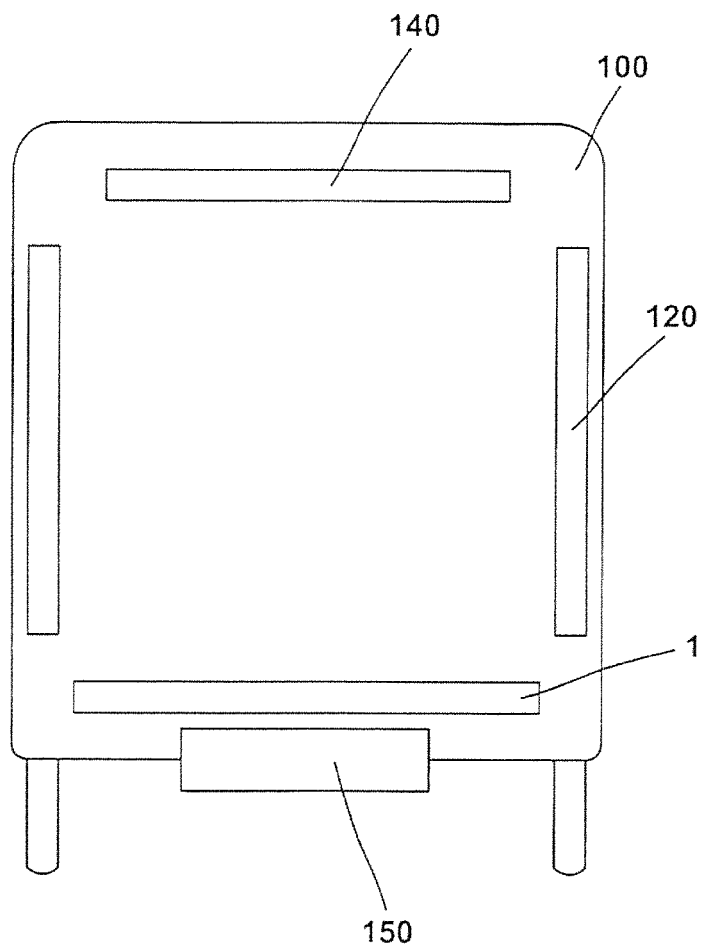
FIG. 5 shows schematically a passage with a side wall and roof covering which in principle is similar or identical to the communication passage as it is the subject matter of FIG. 1.

As has already been set forth, FIG. 5 shows in this connection schematically the arrangement of the side wall covering 120 on both sides of the bellows 100 on the inside of the bellows as well as the roof covering 140 likewise on the inside of the bellows 100. For the sake of clarity, the bellows has been omitted in the FIGS. 1 to 4. The hinged connection below the communication passage 1 has the reference numeral 150. With respect to the side wall covering and with respect to the roof covering it has to be said that both are formed substantially in the same manner as the communication passage 1. With respect to the description of the individual component parts and/or the construction, reference is expressly made insofar to what has been said regarding the FIGS. 1 to 4. Hence, for better understanding, the side wall covering is substantially nothing else than a communication passage, rotated by 90°, with the at least one scissor-type frame being provided behind the side wall covering 120. The side wall covering 120 each comprises a side wall bridge plate 126, 127 located on the front of each vehicle which side wall bridge plates are spaced apart from each other and which are bridged over by the connecting plate 128. The connecting plate 128 is connected with the at least one scissor-type frame 20.

The same applies to the roof covering 140 with the roof bridge plates 146, 147 and the connecting plate 148 for bridging over the distance between the two roof bridge plates 146, 147.

Here, the plate-like element 128, 148 of the side wall covering and the roof covering corresponds to the treadplate 8 of the communication passage; the side wall and the roof bridge plates 126, 127; 146, 147 are to be equated with the bridge plates 6, 7.

Figure 6:
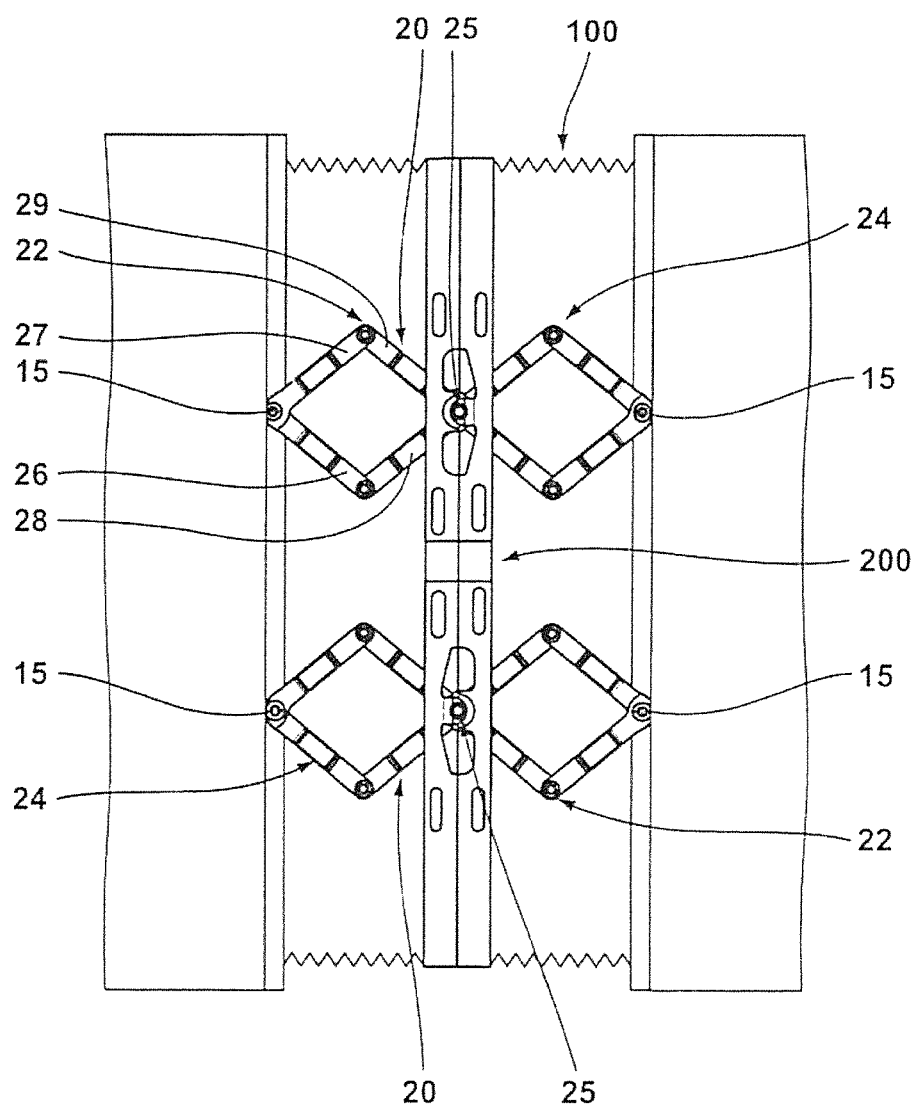
FIG. 6 shows schematically the centering of the central frame of two bellows halves of a bellows as a part of a passage between articulated vehicles.

FIG. 6 shows in plan view two scissor-type frames for centering of the central frame 200 of a bellows with two bellows halves. The two scissor-type frames 20 are connected with the central frame 200 in the area of the pivoting bearing 25 in particular by the coupling device 60. The central frame can be formed by two coupling frames with one coupling member 62, 64 being allocated to each coupling frame. The scissor-type frames are formed in the same way as the scissor-type frames of the communication passage. Insofar, reference is made to them. Connection of the at least one scissor-type frame in each case occurs as for the communication passage, the side wall and the roof covering also by consoles 2, 3.

LIST OF REFERENCE NUMERALS 1 communication passage
2 console
3 console
4 car body
5 car body
6 bridge plate
7 bridge plate
8 treadplate
8a treadplate half
8b treadplate half
10 spiral spring
15 swivel bearing
20 scissor-type frame
22 first (positive) segment
24 second (negative) segment
25 pivoting bearing
26 first scissor arm
27 second scissor arm
28 third scissor arm
29 fourth scissor arm
31 pivoting bearing half
33 first pivoting bearing head (positive pivot segment)
33a leg
33b leg
35 second pivoting bearing head (positive pivot segment)
36 guidance
37 protrusion (pivoting bearing head)
39 pivot pin
40 coupling groove
41 pivoting bearing half
43 first pivoting bearing head (negative pivot segment)
43a leg
43b leg
45 second pivoting bearing head (negative pivot segment)
60 device
62 positive coupling member
63 coupling finger
64 negative coupling member
65 coupling eye
66 threaded cam
70 locking pin
71 opening 72 pin opening
75 locking member
76 locking bolt
80 intermediate member
90 arrow (plane of extension)
100 bellows
120 side wall covering
126 side wall bridge plate
127 side wall bridge plate
128 connecting plate of the side wall covering
140 roof covering
146 roof bridge plate
147 roof bridge plate
148 connecting plate of the roof covering
150 hinged connection between the vehicles or vehicle parts
200 central frame between two bellows halves

The invention claimed is:

1. A scissor-shaped frame, comprising:
   at least one first and one second segment;
   a pivoting bearing connecting the at least one first and one second segments with each other, the pivoting bearing being divided into two pivoting bearing halves perpendicular to a plane of extension of the scissor-shaped frame, each of the at least one first and one second segments being hinged to a component part by a swivel bearing;
   a device for detachable connection of the pivoting bearing halves; and
   each of the segments comprising four scissor arms, the four scissor arms including a first and a second scissor arm connected with each other by a swivel bearing and a third and fourth scissor arms each hinge-linked with the respective one of the first and second scissor arms, the bearing heads of the third and fourth scissor arms cooperating to form a pivoting bearing half.

2. The scissor-shaped frame according to claim 1, wherein the pivoting bearing heads are connected with each other in a force-transmitting manner.

3. The scissor-shaped frame according to claim 1, wherein a first one of the pivoting bearing heads forming a pivoting bearing half comprises two bearing legs spaced apart from each other and a second of the pivoting bearing heads is mounted between the bearing legs of the first pivoting bearing head.

4. The scissor-shaped frame according to claim 3, wherein the first and the second pivoting bearing heads are rotatably connected relative to each other by guidances.

5. The scissor-shaped frame according to 3, wherein the first and the second pivoting bearing heads are formed in the manner of a bearing shell for receiving a pivot pin.

6. The scissor-shaped frame according to 3, wherein the two spaced apart bearing legs of the first pivoting bearing head each comprise a horizontally-extending coupling groove on an upper side and on an underside thereof.

7. The scissor-shaped frame according to claim 6, further comprising a coupling device having a positive and a negative coupling member, the positive and the negative coupling member being lockable with each other, the positive coupling member being attachable on one of the at least one first segments and the negative coupling member being attachable on one of the at least one second segments.

8. The scissor-shaped frame according to claim 7, wherein the positive coupling member comprises two coupling fingers spaced apart from each other for receiving through the coupling grooves.

9. The scissor-shaped frame according to claim 7, wherein the negative coupling member comprises two coupling eyes spaced apart from each other for receiving a pivot pin.

10. The scissor-shaped frame according to claim 7, wherein the negative and the positive coupling member can be connected with each other such that the pivoting bearing heads of the two segments form the pivoting bearing.

11. The scissor-shaped frame according to claim 1, wherein each of the scissor arms comprise replaceable intermediate members.

* * * * *